United States Patent [19]

Kelsey

[11] Patent Number: 5,405,924

[45] Date of Patent: Apr. 11, 1995

[54] IMIDO TRANSITION METAL COMPLEX METATHESIS CATALYSTS

[75] Inventor: Donald R. Kelsey, Fulshear, Tex.

[73] Assignee: Shell Oil Company, Houston, Tex.

[21] Appl. No.: 264,113

[22] Filed: Jun. 22, 1994

Related U.S. Application Data

[63] Continuation of Ser. No. 96,522, Jul. 22, 1993, abandoned.

[51] Int. Cl.$^6$ .................... C08G 61/08; C08F 4/80
[52] U.S. Cl. ........................ 526/142; 526/113;
526/133; 526/134; 526/141; 526/143; 526/161;
526/166; 526/169.1; 526/283; 526/308;
502/103; 502/111; 502/117; 502/124; 502/125;
502/167; 502/172
[58] Field of Search ............. 526/142, 141, 143, 113,
526/161, 283, 308; 502/103, 111, 117, 124, 125,
167, 172

[56] References Cited

U.S. PATENT DOCUMENTS

| | | | |
|---|---|---|---|
| 4,426,502 | 1/1984 | Minchak | 526/172 |
| 4,681,956 | 7/1987 | Schrock | 556/12 |
| 4,727,215 | 2/1988 | Schrock | 585/645 |
| 4,729,976 | 3/1988 | Sjardijn et al. | 502/102 |
| 4,810,762 | 3/1989 | Sjardijn et al. | 526/166 |
| 4,899,005 | 2/1990 | Lane et al. | 585/360 |
| 4,935,394 | 6/1990 | Chang | 502/104 |
| 5,028,672 | 7/1991 | Sjardijn et al. | 526/128 |
| 5,071,812 | 12/1991 | Kelsey | 502/164 |

(List continued on next page.)

FOREIGN PATENT DOCUMENTS 0226957  1/1987  European Pat. Off. .

OTHER PUBLICATIONS

Hackh's Chemical Dictionary, J. Grant (ed.) McGraw-Hill, Inc., N.Y., p. 27 (1969).

(List continued on next page.)

*Primary Examiner*—Fred Teskin

[57] ABSTRACT

An olefin metathesis catalyst system and process for the metathesis polymerization of cyclic olefins, such as dicyclopentadiene, are disclosed. The catalyst system comprises the reaction product of:

(a) an imido transition metal halide complex of formula:

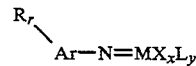

wherein Ar is $C_{6-20}$ aryl, preferably phenyl; M is a transition metal selected from the second and third rows of Groups 5, 6, 7 and 8 of the Periodic Table (IUPAC 1989 convention) and including for example niobium, tantalum, molybdenum, tungsten, rhenium, ruthenium or osmium, preferably tungsten or molybdenum; R is independently halide, $C_{1-20}$ alkyl, $C_{1-12}$ alkoxy, $C_{1-12}$ haloalkyl, $C_{6-20}$ aryl, $C_{6-20}$ aryloxy, cyano or combinations thereof; L is independently a complexing ligand selected from carbonyl, $C_{1-12}$ alkoxy, $C_{1-12}$ haloalkoxy, $C_{1-12}$ alkyl ethers, including mono-, di- and higher ethers, $C_{12}$ alkylnitriles, $C_{5-20}$ pyridines, $C_{3-36}$ tri(hydrocarbyl)phosphines; X is independently halide, preferably chloride; x is 2 to 4; r is independently 0 to 5; y is 0 to 3, preferably 0 or 1; and x+y=3, 4, or 5; and (b) a biphenol of the formula:

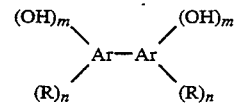

in which each Ar represents an aromatic ring-containing moiety having at least one hydroxyl group attached to an aromatic ring; each R is independently selected from $C_{1-12}$ alkyl, aryl, halide, mono-, di or trihalo methyl, cyano and alkoxy; each n is independently 0–4; and m is independently 1–4; and the catalyst system further includes a co-catalyst.

20 Claims, No Drawings

U.S. PATENT DOCUMENTS

| | | | |
|---|---|---|---|
| 5,082,909 | 1/1992 | Bell | 526/169 |
| 5,093,441 | 3/1992 | Sjardijn et al. | 526/126 |
| 5,095,082 | 3/1992 | Kelsey | 526/282 |
| 5,142,006 | 8/1992 | Kelsey | 526/142 |
| 5,143,992 | 9/1992 | Kelsey | 526/283 |
| 5,194,534 | 3/1993 | Bell | 526/161 |

OTHER PUBLICATIONS

Fox et al., "Simple, High–Yield Syntheses of Molybdenum (VI) Bis(imido) Complexes of the Type Mo(NR)$_2$Cl$_2$(1,2–dimethoxyethane)", *Inorganic Chemistry*, V31, pp. 2287–2289, 1992.

A. D. Horton, R. R. Schrock, and J. H. Freudenberger, A High Yield Route to Rhenium(VII) Bis(Imido) Neopentylidene Complexes, *Organometallics* 1987, 6, 893–894.

R. R. Schrock, I. A. Winstock, A. D. Horton, A. H. Liu, and M. H. Schofield, Preparation of Rhenium(VII) Monoimido Alkylidyne Complexes and Metathesis of Acetylenes via Rhenacyclobutadiene Intermediates, *J. Am. Chem. Soc.*, 1988, 110, 2686–2687.

J. T. Anhaus, T. P. Kee, M. H. Schofield, and R. R. Schrock, Planar "20–Electron" Osmium Imido Complexes. A Linear Imido Ligand Does Not Necessarily Donate Its Lone Pair of Electrons to the Metal, *J. Am. Chem. Soc.*, 1990, 112, 1642–1643.

W. A. Nugent, Synthesis of Some d° Organoimido Complexes of the Early Transition Metals, *Inorg. Chem.*, 1983, 22, 965–969.

Yuan–Wei Chao, Pamela A. Wexler, and David E. Wigley, Preparation and Properties of Tantalum Imido Complexes and Their Reactions with Alkynes. Coordination Control through Multiple Metal–Ligand bonding, *Inorg. Chem.*, 1989, 28, 3860–3868.

IMIDO TRANSITION METAL COMPLEX METATHESIS CATALYSTS

This is a continuation of application Ser. No. 096,522, filed Jul. 22, 1993, now abandoned.

BACKGROUND OF THE INVENTION

The present invention relates to an improved process and catalyst system for the ring-opening or metathesis polymerization of cyclic olefins, such as dicyclopentadiene (DCPD). More specifically, this invention relates to an improved imido transition metal complex catalyst for metathesis polymerization.

DESCRIPTION OF THE RELATED ART

Cyclic olefins are subjected to ring-opening metathesis polymerization to produce thermoplastic and thermoset polymers having physical properties which make them suitable for structural and electronic applications, such as molded plastic items and electrical laminates. Such polymerizations are commonly carried out in reaction injection molding (RIM) processes, in which a metathesis catalyst and a monomer are charged to a heated mold, and polymerization of the monomer and forming of the polymer into the desired shape are carried out simultaneously in the mold.

In such RIM processes, it is important that the polymerization reaction occur rapidly and with as complete incorporation of the charged monomers as possible. For example, the presence of unreacted monomers in molded polydicyclopentadiene has been found to result in a molded part with an unpleasant odor, and less than optimum physical properties. Finding a RIM process that reacts in as short a cycle time as possible and at mold temperatures at or near room temperature is economically desirable. It is also advantageous to be able to use a less than pure monomer stream and thus avoid extensive purification of the monomer prior to polymerization.

Numerous patents and literature references relate to such polymerization in the presence of a variety of olefin metathesis catalysts. Among the more effective ring-opening polymerization catalysts are homogenous catalyst systems based on tungsten or molybdenum halides, often employed with an organotin or organoaluminum co-catalyst. Examples of such catalyst systems are disclosed by Sjardijn et al., U.S. Pat. Nos. 4,810,762 and 5,093,441, wherein phenolic tungsten halides are used with organotin hydrides. Similar catalyst systems are disclosed by Sjardijn et al. in U.S. Pat. No. 4,729,976, which have been found to be highly active in a relatively impure DCPD feed stream. Additional examples are disclosed by Kelsey, U.S. Pat. No. 5,142,006, wherein the catalyst comprises the reaction product of a transition metal halide and a biphenol.

While many metathesis catalysts have been made containing alkoxy or aryloxy ligands, few have been made with imido or imido plus aryloxy ligands. R. Schrock has disclosed imido alkylidene catalysts containing a 5metal carbene (M=C) group and an imido (M=N—Ar) group. These catalysts are highly reactive in the metathesis of linear olefins. See U.S. Pat. Nos. 4,727,215 and 4,681,956. These catalysts generally do not require a co-catalyst and are expensive to make. These catalysts generally cannot be used for RIM processes because RIM processes generally require a catalyst which is stable in the absence of a co-catalyst.

While there have been advances made in developing metathesis catalysts, there continues to be a need for highly reactive catalysts for the polymerization of cyclic olefins and for use in RIM polymerizations. The present invention provides a metathesis catalyst system that is highly reactive, requires relatively small amounts for polymerization of cyclic olefins such as dicyclopentadiene, can be used in RIM polymerizations and is less expensive to manufacture than traditional catalysts.

In U.S. Pat. No. 5,194,534 Bell discloses a catalyst system containing a pure tungsten-imido compound having phenoxy groups on the tungsten. The primary disadvantage associated with this catalyst system is the relatively slow rate of reaction. The present invention relates to the discovery that active metathesis catalysts may be obtained by reacting imido-metal compounds without the carbene ligand (C=M) or carbyne ligand (C≡M) with biphenols. By substituting biphenol for phenol the instant invention has decreased the time frame in which polymerization occurs. The reaction product is then combined with a suitable co-catalyst to form an active metathesis catalyst. The instant catalyst systems are easier to prepare and less expensive. By employing a co-catalyst, a RIM process may be used.

SUMMARY OF THE INVENTION

The present invention provides an improved cyclic olefin metathesis catalyst system for the ring-opening polymerization of cyclic olefins, such as dicyclopentadiene (DCPD). More particularly, the invention provides a catalyst system comprising the reaction product of an imido transition metal complex and a biphenol, and a co-catalyst. The catalyst system of the present invention may be represented by the following olefin metathesis catalyst which comprises:

(1) the reaction product of:
(a) an imido transition metal compound of the formula:

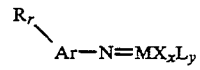

wherein Ar is $C_{6-20}$ aryl, preferably phenyl; M is a transition metal selected from the second and third rows of Groups 5, 6, 7 and 8 of the Periodic Table (IUPAC 1989 convention) and including for example niobium, tantalum, molybdenum, tungsten, rhenium, ruthenium or osmium, preferably tungsten or molybdenum; R is independently halide, $C_{1-20}$ alkyl, $C_{1-12}$ alkoxy, $C_{1-12}$ haloalkyl, $C_{6-20}$ aryl, $C_{6-20}$ aryloxy, cyano combinations thereof; L is independently a complexing ligand selected from carbonyl, $C_{1-12}$ alkoxy, $C_{1-12}$ haloalkoxy, $C_{1-12}$ alkyl ethers, including mono-, di- and higher ethers, $C_{1-12}$ alkylnitriles, $C_{5-20}$ pyridines, $C_{3-36}$ tri(hydrocarbyl)phosphines, wherein the hydrocarbyl includes alkyl, cycloalkyl and aryl, and the like; X is independently halide, preferably chloride; x is 2 to 4; r is independently 0 to 5; y is 0 to 3, preferably 0 or 1; and x+y=3, 4, or 5; and (b) a biphenol of the formula:

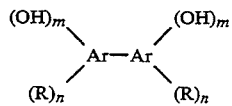

in which each Ar represents an aromatic ring-containing moiety having at least one hydroxyl group attached to an aromatic ring; each R is independently selected from $C_{1-12}$ alkyl, aryl, halide, mono-, di or trihalo methyl, cyano and alkoxy; each n is independently 0–4; and each m is independently 1–4; and (2) a cocatalyst such as organotin hydrides, borohydrides or organoaluminum compounds. In addition, promoters such as boron halides can be present.

The present invention also provides a process for the metathesis polymerization of cyclic olefins, specifically norbornenes. The monomer is mixed with the catalyst system described above and the reaction mixture is injected into a mold under conditions sufficient for polymerization of the monomer of a molded article.

DETAILED DESCRIPTION OF THE INVENTION

The Catalyst

The polymerization catalyst described herein when combined with a co-catalyst is highly reactive in the ring-opening metathesis polymerization of cyclic olefins. Ring-opening metathesis catalysts facilitate the breaking of the monomer ring at double bonds to form linear and crosslinked unsaturated polymers.

The polymerization catalyst of this invention comprises the reaction product of an imido transition metal halide and a biphenol. To obtain high activity of the resulting metathesis catalyst, the transition metal is 5preferably a transition metal selected from the second and third rows of Groups 5, 6, 7 and 8 of the Periodic Table (IUPAC 1989 convention) and including for example niobium, tantalum, molybdenum, tungsten, rhenium, ruthenium or osmium, preferably tungsten or molybdenum. The catalysts of the present invention may be represented by the following metathesis catalyst system which includes the reaction product of:

(a) an imido transition metal compound of the formula:

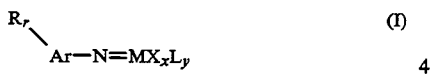

wherein

Ar is $C_{6-20}$ aryl, preferably phenyl;

M is a transition metal selected from the second and third rows of Groups 5, 6, 7 and 8 of the Periodic Table (IUPAC 1989 convention) and including for example niobium, tantalum, molybdenum, tungsten, rhenium, ruthenium or osmium, preferably tungsten or molybdenum; R is independently halide, $C_{1-20}$ alkyl, $C_{1-12}$ alkoxy, $C_{1-12}$ haloalkyl, $C_{6-20}$ aryl, $C_{6-20}$ aryloxy, cyano or combinations thereof;

L is independently a complexing ligand selected from carbonyl, $C_{1-12}$ alkoxy, $C_{1-12}$ haloalkoxy, $C_{1-12}$ alkyl ethers, including mono-, di-, and higher ethers, $C_{1-12}$ alkylnitriles, $C_{5-20}$ pyridines, $C_{3-36}$ tri(hydrocarbyl)phosphines, wherein the hydrocarbyl includes alkyl, cycloalkyl and aryl, and the like;

X is independently halide, preferably chloride;

x is 2 to 4;

r is independently 0 to 5;

y is 0 to 3, preferably 0 or 1;

x+y=3, 4, or 5; and (b) a biphenol of the formula:

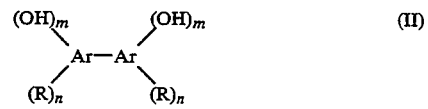

in which each Ar represents an aromatic ring-containing moiety having at least one hydroxyl group attached to an aromatic ring; each R is independently selected from $C_{1-12}$ alkyl, aryl, halide, mono-, di or trihalo methyl, cyano and alkoxy; each n is independently 0–4; and each m is independently 1–4.

Suitable examples of imido transition metal compounds include phenylimidotungsten tetrachloride, (2,6-diisopropyl-phenylimido)tungsten tetrachloride, (4-methylphenylimido)tetrachlorotungsten, (2,6-dimethylphenylimido)tetrachloro(diethylether)tungsten, [2,6-dimethylphenylimidotungsten tetrachloride diethyl ether complex], (phenylimido)tetrachloro(diethylether)tungsten, (phenylimido)tetrachloro(tetrahydrofuran)tungsten, (phenylimido)bis(diphenylmethylphosphine)trichlorotungsten, (phenylimido)ethoxy(trimethylphospine)trichlorotungsten, (phenylimido)tetrachloro(acetonitrile)tungsten, (phenylimido)tetrachloro(pyridine)tungsten, (2,6-diisopropylphenylimide) bis(hexafluoro-t-butoxy)dichloro(tetrahydrofuran)tungsten, (phenylimido)tetrachloro(acetonitrile)rhenium, (pentafluorophenylimido)tetrafluororhenium, (2,6-diisopropylphenylimido)trichlorobis(pyridine)tantalum, (4-chlorophenylimido)trichloro-bis(triphenylphosphine)osmium, (2-cyanophenylimido)trichloroniobium, (phenylimido)-trichlorobis(tetrahydrofuran)niobium and the like. Preferred examples of imido transition metal compounds are arylimidotungsten tetrahalides.

The imido compounds of this invention are conveniently prepared by reacting a transition metal oxide or oxo complex, preferably an oxyhalide, with an aryl isocyanate. This method is particularly preferred for making imido tungsten compounds. Suitable halides include chloride, bromide and fluoride. Examples of metal oxyhalides are tungsten oxytetrachloride, tungsten oxytetrabromide, tungsten oxytetrafluoride, tungsten dioxydichloride, molybdenum oxytrichloride, molybdenum oxytetrachloride, molybdenum oxytetrafluoride, molybdenum dioxydichloride and the corresponding bis ether complex (e.g., $MoO_2Cl_2$(tetrahydrofuran)$_2$), molybdenum dioxydibromide, molybdenum trioxyhexachloride, molybdenum trioxypentachloride and mixtures thereof. Some preferred transition metal oxyhalides are tungsten oxytetrachloride, molybdenum oxytrichloride and molybdenum oxytetrachloride.

The preferred aryl isocyanates may be represented by the following formula:

wherein R, Ar and r are defined as for Formula I above.

Preferred aryl isocyanates include phenyl isocyanates such as phenyl isocyanate, 2,6-diisopropylphenyl isocyanate, dimethylphenylisocyanate, pentafluorophenyl isocyanate, dichlorophenyl isocyanate, and trifluoromethylphenyl isocyanate. The amount of isocyanate used is generally about 0.5 to about 1.0 mole per mole of oxo ligand in the transition metal aryl halide, preferably about 1.0 mole per mole of transition metal.

Examples of suitable substituted aryl isocyanates include:

| | |
|---|---|
| 2-bromophenyl isocyanate | 3-bromophenyl isocyanate |
| 2-chlorophenyl isocyanate | 3-chlorophenyl isocyanate |
| 4-chlorophenyl isocyanate | 2,3-dichlorophenyl isocyanate |
| 2,4-dichlorophenyl isocyanate | 2,5-dichlorophenyl isocyanate |
| 2,6-dichlorophenyl isocyanate | 3,4-dichlorophenyl isocyanate |
| 3,5-dichlorophenyl isocyanate | 2-fluorophenyl isocyanate |
| 3-fluorophenyl isocyanate | 4-fluorophenyl isocyanate |
| 2,4-difluorophenyl isocyanate | 2,6-difluorophenyl isocyanate |
| 2,3,4,5,6-pentafluorophenyl isocyanate | 2-methylphenyl isocyanate |
| 3-methylphenyl isocyanate | 4-methylphenyl isocyanate |
| 2,6-dimethylphenyl isocyanate | 2-ethylphenyl isocyanate |
| 2-methoxyphenyl isocyanate | 3-methoxyphenyl isocyanate |
| 4-methoxyphenyl isocyanate | 2,4-dimethoxyphenyl isocyanate |
| 2,5-dimethoxyphenyl isocyanate | 2-trifluoromethylphenyl isocyanate |
| 3-trifluoromethylphenyl isocyanate | 4-trifluoromethylphenyl isocyanate |
| 1-naphthyl isocyanate | 2-naphthyl isocyanate |
| 4-phenylphenyl isocyanate | |

Another general method for preparing the compounds of Formula I is the reaction of an aryl primary amine, preferably an aniline, with a metal oxide often in the presence of agents to remove or react with the water and/or hydrogen halide generated in the reaction. Examples of metal oxides are those listed above and ammonium dimolybdate, ammonium oxydecachlorodiruthenium, rhenium oxide, ammonium perrhenate, and tetrabutylammonium perrhenate. See Fox et al., "Simple, High-Yield Syntheses of Molybdenum (VI) Bis (imido) Complexes of the Type Mo(NR)₂Cl₂( 1,2- dimethoxy-ethane), Inorganic Chemistry, v. 31, pp. 2287–2289 (1992). This method is often advantageous for the preparation of imido molybdenum and rhenium compounds.

The preferred anilines may be represented by the following formula:

wherein R, Ar and r are defined as for Formula I above. Preferred compounds include 2,6-diisopropylaniline, aniline, dimethylaniline, dichloroaniline, and pentafluoroaniline.

The aniline compound is usually utilized in an amount of from about 1.0 to about 2.0 moles of aniline per mole of transition metal.

Examples of suitable aniline compounds include:

| | |
|---|---|
| 4'-aminoacetophenone | 4-aminobenzophenone |
| 2-aminobenzotrifluoride | 3-aminobenzotrifluoride |
| 4-aminobenzotrifluoride | 2-aminobiphenyl |
| 4-aminobiphenyl | 2-amino-5-chlorobenzotrifluoride |
| 3-amino-4-chlorobenzotrifluoride | 5-amino-2-chlorobenzotrifluoride |
| 4-aminophenyl ether | o-, m-, p-anisidine |
| 2-benzylaniline | 3,5-bis(trifluoromethyl)aniline |
| 2-, 3-, or 4-bromoaniline | 4-bromo-2-chloroaniline |
| 4-bromo-2,6-difluoroaniline | 2-bromo-4,6-difluoroaniline |
| 4-bromo-2,6-dimethylaniline | 4-bromo-2-fluoroaniline |
| 2-bromo-4-methylaniline | 4-bromo-2-methylaniline |
| | 4-bromo-2,3,5,6-tetrafluoroaniline |
| 4-bromo-3-methylaniline | 2-bromo-4,5,6-trifluoroaniline |
| 2-bromo-3,4,6-trifluoroaniline | 4-bromo-2-trifluoromethylaniline |
| 4-bromo-3-trifluoromethyl-aniline | 4-butoxyaniline |
| 6-bromo-3-trifluoromethyl-aniline | 4-sec-butylaniline |
| 4-butylaniline | 2- 3- or 4-chloroaniline |
| 4-tert-butylaniline | 5-chloro-o-anisidine |
| 3-chloro-p-anisidine | 3-chloro-4-fluoroaniline |
| 6-chloro-m-anisidine | 2-chloro-4-methylaniline |
| 4-chloro-2-fluoroaniline | 2-chloro-6-methylaniline |
| 2-chloro-5-methylaniline | 3-chloro-4-methylaniline |
| 3-chloro-2-methylaniline | 5-chloro-2-methylaniline |
| 4-chloro-2-methylaniline | 4-decylaniline |
| 4-cyclohexylaniline | 2,6-dibromo-4-methylaniline |
| 2,4-, 2,5- or 2,6-dibromoaniline | 2,3-, 2,4-, 2,5-, 2,6-, 3,4- or 3,5-dichloroaniline |
| 2,5-di-t-butylaniline | 2,6-diethylaniline |
| 2,6-dichloro-3-methylaniline | 2,4-, 2,5-, or 3,5-dimethoxyaniline |
| 2,6-diisopropylaniline | 4-dodecylaniline |
| 2,4- or 2,6-diphenylaniline | 6-ethyl-2-methylaniline |
| 2-, 3-, or 4-ethylaniline | 3-fluoro-o-anisidine |
| 2-, 3-, or 4-fluoroaniline | 2-fluoro-5-methylaniline |
| 2-fluoro-4-iodoaniline | 3-fluoro-4-methylaniline |
| 3-fluoro-2-methylaniline | 5-fluoro-2-methylaniline |
| 4-fluoro-2-methylaniline | 4-hexadecylaniline |
| 4-heptylaniline | 4-hexyloxyaniline |
| 4-hexylaniline | 2- or 4-isopropylaniline |
| 2-, 3-, or 4-iodoaniline | 2-methoxy-5-methylaniline |
| 2-isopropyl-6-methylaniline | 5-methoxy-3-trifluoromethylaniline |
| 4-methoxy-2-methylaniline | 2,3,4,5,6-pentafluoroaniline |
| 4-octylaniline | 4-pentyloxyaniline |
| 4-pentylaniline | 4-phenoxyaniline |
| 2-, 3-, 4-phenylaniline | 2-propylaniline |
| 5-phenyl-2-methylaniline | 2,3,4,5- and |
| 4-propylaniline | 2,3,5,6-tetrachloroaniline |
| 4-tetradecylaniline | 2,3,5,6-tetrafluoroaniline |
| 2-, 3- or 4-methylaniline | 2,4,6-tribromoaniline |
| 2,4,6-tri-t-butylaniline | 2,4,6-trimethylaniline |
| 2,4,6-triphenylaniline | |
| 2,3-, 2,4-, 2,5-, 2,6-, 3,4- or 3,5-difluoroaniline | |
| 2,3-, 2,4-, 2,5-, 2,6-, 3,4- or 3,5-dimethylaniline | |
| 3,4,5,6-tetrafluoro-2-trifluoromethylaniline | |
| 2,4,5,6-tetrafluoro-3-trifluoromethylaniline | |
| 2,3,5,6-tetrafluoro-4-trifluoromethylaniline | |
| 2,4,5-, or 2,4,6-, or 3,4,5-trichloroaniline | |
| 2,3,4-, 2,3,6-, or 2,4,5-, or 2,4,6-trifluoroaniline | |

In a closely related method, a transition metal halide or oxide may be reacted with derivatives of the anilines described above, such as the N-trimethylsilyl derivatives. Examples of some additional suitable metal halides include tantalum pentachloride and niobium pentachloride and the corresponding bromides and fluorides. See, for example, Chao et al., Inorganic Chemistry, 28, 3860 (1989) and Nugent, Inorganic Chemistry, 22, 65 (1983).

Suitable biphenols include 2,2'-biphenol, 4,4'-biphenol, 1,1'-bi-2-naphthol, tetratertiary-amyl-2,2'-biphenol, tetra-tertiary-amyl-4,4'-biphenol, tetra-tertiary-butyl-2,2'-biphenol, tetra-tertiary-butyl-4,4'-biphenol, 2,2'-dihydroxyfluorene, 4,4'-dihydroxyfluorene, and the like.

In the preparation of the catalyst system, the biphenol will generally be present in the reaction mixture in the range of about 0.2 to about 2.0 moles per mole of the transition metal, preferably from about 0.3 to about 1.5 moles, most preferably about 0.4 to about 1.0 moles, and such that at least about one halide per transition metal atom remains in the reaction product.

In a preferred embodiment, the imido transition metal compound (Formula I) can be prepared by contacting, under an oxygen-free inert atmosphere, the isocyanate compound and the transition metal oxide each in an inert organic liquid with mild heat (within the range of about 25° to about 150° C., preferably between about 40° and about 100° C.) and removal of generated carbon dioxide. The biphenol is then introduced to the reaction mixture and heated further within the range of from about 25° C. to about 100° C. with removal of generated hydrogen halide to produce the biphenol-containing imido-transition metal component of the catalyst system of the invention. Alternatively, the imido transition metal halide of Formula I is reacted separately with the biphenol as described above. Suitable inert organic liquids for the reaction include cyclopentane, cyclohexane, benzene, toluene, xylene, chlorobenzene and dichlorobenzene. The inert organic liquid is then preferably distilled off under vacuum. The reaction product is preferably stored neat at room temperature or dissolved in the cyclicolefin monomer or in an inert organic solvent such as toluene. Any co-catalyst is generally combined with the transition metal catalyst in the reaction mixture as a solution of the monomer to be polymerized. The boron halide promoter, if used, is generally combined with the transition metal and/or co-catalyst solution.

The Co-Catalyst

The catalyst of the present invention may be used in combination with one or more co-catalysts for ring opening polycycloolefin polymerization. An example of a suitable co-catalyst is a borohydride co-catalyst, including those compounds which can be represented by the formula $[Y+][BH_mZ_n]^-$, in which $Y+$ represents an organic or organometallic cationic counterion, Z is a substituent group such as alkyl, cyano, halide, and the like, $m>0$ and $m+n=4$. Particularly preferred are borohydrides represented by the formula $[R_3P]_2[M+]BH_4^-$, in which each R is independently selected from $C_{1-20}$, preferably $C_{2-12}$, hydrocarbyl, preferably aryl. Examples of such borohydrides include transition metal-based borohydrides such as bis(triphenylphosphine) copper (I) borohydride and ammonium borohydrides such as bis(triphenylphosphoranylidene) ammonium borohydride.

Effectiveness of the borohydride depends to some extent on its solubility in the monomer to be polymerized. Borohydrides with poor solubility such as sodium triethyl borohydride, sodium borohydride and tetrabutyl ammonium borohydride are generally not active as co-catalysts in non-polar cyclic olefins such as DCPD. Preferred co-catalysts, because of their activity in DCPD and similar monomers, are those represented by the above borohydride formula in which $m=4$, $n=0$ and $Y+$ includes aromatic groups such as triarylphosphine and tetraaryldiphosphine, such as 1,2-bis(diphenylphosphine)ethane, moieties.

Suitable co-catalysts can also include, for example, an organo aluminum compound, including trialkyl aluminum, alkylaluminum dihalides, dialkyl aluminum halides or alkyl(alkoxy) aluminum halides. Suitable co-catalysts can also include an organo tin hydride compound, including compounds which can be represented by the formula $Sn(R)_3H$, in which each R is selected independently from hydrogen, substituted or unsubstituted aryl, or $C_{1-20}$ alkyl. Specific examples of such co-catalysts include ethyl aluminum chloride, diethyl aluminum chloride, trioctyl aluminum, tributyltin hydride, tripentyltin hydride, diphenyltin dihydride, trioctyltin hydride, methyldicyclohexyltin hydride, cyclopentyldimethyltin hydride, triphenyltin hydride, phenyldimethyltin hydride and allyltin trihydride. Tributyltin hydride, trioctyltin hydride, and triphenyltin hydride are preferred catalysts. Substituents on the R groups in the above formula can include, for example, $C_{1-20}$ alkoxy and halides.

Catalyst System

As used herein, the catalyst system comprises the reaction product of an imido transition metal complex and a biphenol, and a co-catalyst. The catalyst system may optionally include a moderator or a boron halide promoter. The co-catalyst will be present in the catalyst system composition in an amount effective to enhance the activity of the imido transition metal halide catalyst, which will vary depending upon the specific components present and the reaction conditions. In general, the co-catalyst will be present in a molar amount of from about 15:1 to about 0.2:1, preferably from about 8:1 to about 1:1, based on moles of transition metal catalyst.

The catalyst system may include a moderator to delay the initiation of polymerization if the selected catalyst and co-catalyst cause instant polymerization upon contact. Ethers, esters, ketones, nitriles and polar cyclic olefins are among suitable moderators for catalyst systems comprising tungsten catalyst and alkyl aluminum cocatalyst. Ethyl benzoate, butyl ether bis(2-methoxyethyl) ether and polar cyclic olefins are preferred moderators. Moderators are generally not necessary for catalyst systems having a tin hydride or borohydride co-catalyst.

The catalyst system may also optionally include a boron halide promoter, including boron trihalides, boron trihalide complexes and tetrahaloborates. The boron promoter can be, for example, such boron halides as boron tribromide, boron trifluoride, boron trifluoride diethyl ether complex, boron trifluoride dibutyl ether complex, boron trifluoride ethylamine, tetrafluoroboric acid diethyl ether, methyl boron difluoride, phenyl boron dichloride, triphenylmethyl fluoroborate, ammonium tetrafluoroborate, bis(2-ethyl-1-hexyl)ammonium tetrafluoroborate, boron trichloride dimethylsulfide, boron trifluoride alcohol complexes, and the like. The boron compound will be present in the polymerization reaction mixture in an amount effective to promote polymerization of the cyclic olefin monomer, generally from about 0.01 to about 10 moles, preferably from about 0.05 to about 2 moles, per mole of transition metal. The optimum level will vary depending upon the catalyst and the co-catalyst, and amounts of boron halide above the optimum may inhibit polymerization. The presently-preferred boron halides, because of their high activity and stability, are boron trifluoride and its ethyl ether and butyl ether complexes.

Polymerization

The polymerization process of the invention involves contacting one or more cyclic olefin monomers with the catalyst system composition. Preferred cyclic olefin monomers and comonomers include polycycloolefins containing a norbornene (bicyclo-[2.2.1-]heptene) group which can be represented by the structural formulas:

in which each R″ is selected independently from hydrogen, $C_{1-20}$ alkyl, $C_{1-20}$ alkenyl, $C_{3-8}$ cycloalkyl, $C_{3-8}$ cycloalkenyl, and $C_{6-20}$ aryl and, with R″ groups linked together through carbon atoms, saturated and unsaturated cyclic hydrocarbon groups. Included in such monomers and comonomers are dicyclopentadiene, norbornene, norbornadiene, 5-(2-propenyl)norbornene, cyclohexenylnorbornene, and the like; and adducts of vinyl cyclohydrocarbons, e.g. 4-vinylcyclohexene and cyclopentadiene or 3,5-divinylcyclopentene and cyclopentadiene and others as described in Kelsey, U.S. Pat. Nos. 5,095,082 and 5,143,992. Commercial cyclic olefins are available at various levels of purity, ranging from about 92 to about 99.9, the upper purity ranges being the result of distillation and further treatment for removal of contaminants and olefins which would be co-polymerized under polymerization conditions. As a general rule, transition metal catalysts employing an alkyl aluminum compound as co-catalyst require a high-purity monomer for acceptable polymerization activity, while the use of a tin hydride or borohydride co-catalyst permits the use of lower purity, technical-grade (83–95%) dicyclopentadiene monomer. An advantage of the invention catalyst is that it is very active in relatively impure (90–95%) dicyclopentadiene.

The ring-opening polymerization of the invention is conducted by contacting the cycloolefin monomer and the catalyst system under polymerization conditions. It is, on some occasions, useful to provide an inert diluent in order to solubilize the catalyst system components. The catalyst system components will typically have the necessary solubility in the cycloolefin to be polymerized and in the preferred embodiment no added diluent is employed and the catalyst system components and the cycloolefinic monomer are contacted directly. Suitable polymerization conditions for such contacting include a polymerization temperature of from about 20° C. to about 250° C. with polymerization temperatures from about 30° C. to about 150° C. being preferred. The polymerization pressure is that pressure required to maintain the polymerization mixture in a non-gaseous state. Such pressures will vary with the reaction temperature but pressures up to about 5 atmospheres are satisfactory and frequently ambient pressure is suitable and is preferred.

The inventive polymerization process is preferably carried out by reaction injection molding (RIM), in which a solution of the catalyst system, preferably in the monomer liquid to be polymerized, is injected into a mold simultaneously with the monomer, in liquid form, to be polymerized. The catalyst is generally employed in a molar ratio of RIM monomer to transition metal (mole:mole) of from about 200:1 to about 12,000:1, preferably about 500:1 to about 8000:1, most preferably about 1000:1 to about 5000:1.

In an illustrative polymerization, the monomer and catalyst system are mixed at a relatively low temperature at which rapid polymerization does not occur. The relatively low reaction rate permits efficient mixing or other processing of the polymerization mixture including the incorporation of fillers, reinforcements, anti-oxidants, stabilizers, pigments, elastomers or other materials provided to influence the properties of the polymerization product. A particularly contemplated embodiment of the process is in a reaction injection molding (RIM) process. Because of the relatively low initial rate of reaction, the monomer and catalyst system are mixed, typically by providing each component of the catalyst system with a portion of the cycloolefinic monomer, and the mixture is then transferred (injected) to a suitable mold including those molds for the production of large castings of complex shape. Notwithstanding the low initial reaction rate, the mixing and transfer must be accomplished rather quickly, for in a typical RIM process, the mixing/transfer time is on the order of a few seconds. Moreover, shortly after mixing of the monomer and catalyst system, a significant reaction exotherm occurs which substantially increases the temperature of the polymerizing mixture. While such an exotherm is at least in part beneficial in that the time for polymerization in the mold is reduced, it also requires that processing of the polymerization mixture be rapidly completed.

In an alternative RIM polymerization technique, a stream of the transition metal catalyst component in the monomer to be polymerized and a monomer stream containing any co-catalyst employed are combined in the mixing head of a RIM machine just prior to injection of the combined stream into a mold. The boron halide promoter, if used, is injected into the mixing head with the transition metal stream, with the cocatalyst stream, or in a separate monomer solution stream.

The initial mold temperature will generally be within the range of about 20° to about 200° C., preferably about 30° to about 150° C. The mold pressure is generally within the range of about 10 to about 50 psi. After injection of the catalyst and monomer into the mold, there is an interval of time, called the "induction time," before onset of a rapid exotherm from the exothermic polymerization reaction. In a commercial RIM process, this induction time should be sufficiently long to permit filling of the mold, typically about 2 minutes, preferably less than thirty seconds. Once the polymerization reaction is initiated, polymerization should occur quite rapidly, usually within about 10 seconds to about 1 minute, and is accompanied by a rapid rise in temperature.

Various optional components can be present in the reaction mixture during polymerization, including solvents, fillers, anti-oxidants, flame retardants, blowing agents, stabilizers, foaming agents, pigments, plasticizers, reinforcing agents and impact modifiers. Particularly preferred is the addition of from about 1 to about 10 weight percent, based on the weight of the monomer, of an elastomer for impact modification of the polymer. These components are most conveniently added to the reaction as constituents of one or more of the reaction mixture streams, as liquids or as solutions in the monomer.

After the polymerization reaction is complete, the molded object may be subjected to an optional post-cure treatment at a temperature in the range of about 100° to about 300° C. for about 1 to 24, preferably about 1 to 2 hours. Such a post-cure treatment can enhance certain polymer properties, including glass transition temperature.

The polymerized products of this invention are soluble linear thermoplastic polymers or hard, insoluble, crosslinked thermoset polymers having utility such as parts for cars, agriculture, housings for instruments or machines, in electronics, and marine applications.

The invention is further described by the following examples which should not be regarded as limiting.

COMPARATIVE EXAMPLE A

Preparation of 2,6-Diisopropylphenylimidotungsten Tetrachloride

Tungsten oxytetrachloride (Aldrich; 0.854 g, 2.5 mmol) and 25 mL dry toluene were charged to a reaction flask under nitrogen and heated to 70° C. under argon. A solution of 2,6-diisopropylphenyl isocyanate (Aldrich, 98%, 0.5 19 g, 2.5 mmol) in 5 mL dry toluene was prepared under nitrogen and added via syringe to the tungsten solution and rinsed in with an additional 5 mL dry toluene. The reaction mixture was then heated to 95° C. under a flow of argon (which flow passed through a bubbler, a drying tube, and into a BaOH solution (3 g BaOH.8H$_2$O in 50 gm water) to detect the $CO_2$ generated by the reaction) for about 5.5 hrs, the temperature was lowered to 70° C. and the reaction continued overnight (16 hrs), the temperature was raised again to 95° C. and heated for about 8 hours, cooled to room temperature over the weekend, heated to 95° C. for about 6 hours, at which time the evolution of $CO_2$ had virtually ceased. Toluene was then distilled off under vacuum at 25°–50° C. to yield a viscous brown residue.

INVENTIVE EXAMPLE 1

Preparation of Imido/Biphenol Tungsten Catalyst

Tungsten oxytetrachloride (1.71 g, 5 mmol) and 2,6-diisopropylphenyl isocyanate (1.04 g, 5 mmol) were combined in toluene and heated at 95° C. for about 25 hours essentially as in the procedure given in Comparative Example A until the evolution of $CO_2$ had nearly ceased. The reaction mixture was then cooled to 70° C. and a 2% solution (23.3 g) containing 0.4655 g (2.5 mmol) 2,2'-biphenol was added along with 5 mL toluene rinse. The reaction mixture was then heated at 70° C. for about 3 hours and at 90° C. for about 1.7 hours under an argon flow to remove the HCl formed. The toluene was distilled off under vacuum to give a hard, brown residue which was redissolved in toluene as a 10% solution.

The imido catalysts of Examples A & 1 were used for laboratory polymerizations of DCPD (16 g) carried out in a 90° C. oil bath.

INVENTIVE EXAMPLES 2 AND 3

Similarly, imido catalysts were prepared, as in Example 1, using 1 mole of 2,2'-biphenol per mole of tungsten and 0.5 mole tetra-t-butyl-2,2'-biphenol per mole of tungsten.

COMPARATIVE EXAMPLE B

An imido catalyst was prepared, as in Example 1, using 1 mole of 2,6-diisopropylphenol per mole of tungsten.

EXAMPLES 4–26

The following table shows the polymerization of dicyclopentadiene for various mixtures of the catalysts of Examples A, B, 1, 2 and 3 and co-catalysts.

Examples 4–26 demonstrate some of the advantages of using biphenols as the reactant as opposed to using phenols as the reactant.

In Example 15 the imido catalyst system comprises 2,6-diisopropylphenyl tungsten tetrachloride and 2,2'-biphenol and tributyltin hydride. This catalyst system immediately polymerized the dicyclopentadiene. In Example 23 the same co-catalyst was used but the 2,6-diisopropylphenyl tungsten tetrachloride was reacted with 2,6-diisopropylphenol instead of 2,2'-biphenol. Polymerization did not begin until 1.3 minutes had passed. When the results of Examples 16–17 are compared to those of Examples 24–25 the faster reaction of the catalyst with the biphenol reactant is again demonstrated.

In Example 4 polymerization proceeds immediately and the exotherm maximum is reached in 2.1 minutes. In Example 19 polymerization proceeds immediately and the exotherm maximum is reached in 0.8 minutes. Thus demonstrating another advantage of using a biphenol reactant.

In Examples 12 and 20 polymerization proceeds immediately and the exotherm maximum is reached in 1.1 minutes and 0.7 minutes, respectively. In Example 24 polymerization does not proceed immediately and the exotherm maximum is not reached until 2.1 minutes have passed.

| | | | | Polymerization of Dicyclopentadiene With Imido Catalysts | | | |
|---|---|---|---|---|---|---|---|
| | DCPD/W | | Co-catalyst/W/BF$_3$[b] | Onset | | Exotherm Max. | |
| Example | (mol/mol) | Co-catalyst[a] | (mol/mol/mol) | Time (min) | T (°C.) | Time (min) | T (°C.) |
| 2,6-diisopropylphenylimidotungsten tetrachloride | | | | | | | |
| 4 | 2000/1 | TBTH | 4/1/— | immediate | | 2.1 | 185 |
| 5 | 2000/1 | TBTH | 2/1/— | immediate | | 2.4 | 182 |
| 6 | 2000/1 | TBTH | 1.47/1/— | immediate | | 1.5 | 189 |
| 7 | 1800/1 | TBTH | 3.6/1/0.44 | immediate | | 0.6 | 212 |
| 8 | 2000/1 | TBTH | 2/1/0.25 | 0.3 | 37 | 0.8 | 201 |
| 9 | 2000/1 | CuBH$_4$ | 4/1/— | 3.2 | 83 | 5.5 | 192 |
| 10 | 1000/1 | none | | NR | | | |
| 2,6-diisopropylphenylimidotungsten tetrachloride + 2,2'-biphenol [W/biphenol = 2] | | | | | | | |
| 11 | 2000/1 | TBTH | 3.8/1/— | ND | | 2.6 | 180 |
| 12 | 3000/1 | TBTH | 4/1/0.25 | 0.4 | 32 | 1.1 | 189 |
| 13 | 2000/1 | CuBH$_4$ | 3.8/1/— | 3.3 | 85 | 5.1 | 199 |
| 14 | 1000/1 | none | | NR | | | |
| 2,6-diisopropylphenylimidotungsten tetrachloride + 2,2'-biphenol [W/biphenol = 1] | | | | | | | |
| 15 | 2000/1 | TBTH | 4/1/— | immediate | | 3.6 | 178 |
| 16 | 3000/1 | TBTH | 4/1/0.25 | 1.0 | 41 | 1.6 | 214 |
| 17 | 2000/1 | CuBH$_4$ | 4/1/— | 2.6 | 76 | 4.1 | 183 |
| 18 | 1000/1 | none | | NR | | | |
| 2,6-diisopropylphenylimidotungsten tetrachloride + tetra-t-butyl-2,2'-biphenol [W/biphenol = 2] | | | | | | | |
| 19 | 2000/1 | TBTH | 4/1/— | immediate | | 0.8 | 192 |
| 20 | 3000/1 | TBTH | 4/1/0.25 | immediate | | 0.7 | 134 |

-continued

Polymerization of Dicyclopentadiene With Imido Catalysts

| Example | DCPD/W (mol/mol) | Co-catalyst[a] | Co-catalyst/W/BF$_3$[b] (mol/mol/mol) | Onset Time (min) | Onset T (°C.) | Exotherm Max. Time (min) | Exotherm Max. T (°C.) |
|---|---|---|---|---|---|---|---|
| 21 | 2000/1 | CuBH$_4$ | 4/1/— | ND | ND | 10.5 | 141 |
| 22 | 1000/1 | none | | NR | | | |
| 2,6-diisopropylphenylimidotungsten tetrachloride + 2,6-diisopropylphenol [W/phenol = 1] | | | | | | | |
| 23 | 2000/1 | TBTH | 4/1/— | 1.3 | 53 | 2.1 | 210 |
| 24 | 3000/1 | TBTH | 4/1/0.25 | 1.5 | 38 | 2.1 | 202 |
| 25 | 2000/1 | CuBH$_4$ | 4/1/— | 3.2 | 77 | 4.1 | 215 |
| 26 | 1000/1 | none | | NR | | | |

[a]TBTH = tributyltin hydride; CuBH$_4$ = Bis(triphenylphosphine)copper (I) borohydride;
[b]BF$_3$ dibutyl ether complex; NR = no reaction; ND = not determined While various modifications and changes will be apparent to one of ordinary skill in the art, such changes are included in the scope of this invention as defined by the appended claims.

What is claimed is:

1. An olefin metathesis catalyst system comprising (1) the reaction product of:
   (a) an imido transition metal compound of the formula:

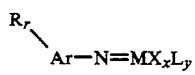

wherein Ar is $C_{6-20}$ aryl; M is a transition metal selected from the second and third rows of Groups 5, 6, 7 and 8 of the Periodic Table; R is independently halide, $C_{1-20}$ alkyl, $C_{1-12}$ alkoxy, $C_{1-12}$ haloalkyl, $C_{6-20}$ aryl, $C_{6-20}$ aryloxy, cyano or combinations thereof; L is independently a complexing ligand selected from carbonyl, $C_{1-12}$ alkoxy, $C_{1-12}$ haloalkoxy, $C_{1-12}$ alkyl ethers, $C_{1-12}$ alkylnitriles, $C_{5-20}$ pyridines, $C_{3-36}$ tri(hydrocarbyl)phosphines; X is independently halide; x is 2, 3 or 4; r is independently 0 to 5; y is 0 to 3; and x+y=3, 4 or 5; and
   (b) a biphenol of the formula:

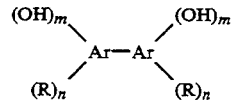

in which each Ar represents an aromatic ring-containing moiety having at least one hydroxyl group attached to an aromatic ring; each R is independently selected from $C_{1-12}$ alkyl, aryl, halide, mono-, di or trihalo methyl, cyano and alkoxy; each n is independently 0–4; and each m is independently 1–4; and
   (2) a co-catalyst.

2. The catalyst system of claim 1 wherein the biphenol is selected from the group consisting of 2,2'-biphenol, 4,4'-biphenol, 1,1'-bi-2-naphthol, tetra-tertiary-amyl-2,2'-biphenol, tetra-tertiary-amyl-4,4'-biphenol, tetra-tertiary-butyl-2,2'-biphenol and tetra-tertiary-butyl -4,4'-biphenol.

3. The catalyst system of claim 1 wherein the imido transition metal compound is selected from the group consisting of phenylimidotungsten tetrachloride, (2,6-diisopropylphenylimido)tungsten tetrachloride, (4-methylphenylimido)tetrachlorotungsten, (2,6-dimethylphenylimido)tetrachloro(diethylether)tungsten, (phenylimido)tetrachloro(diethylether)tungsten, (phenylimido)tetrachloro(tetrahydrofuran)tungsten, (phenylimido)bis(diphenylmethylphosphine)trichlorotungsten, (phenylimido)ethoxy(trimethylphosphine)trichlorotungsten, (phenylimido)tetrachloro(acetonitrile)tungsten, (phenylimido)tetrachloro(pyridine)tungsten, (2,6-diisopropylphenylimido)bis(hexafluoro-t-butoxy)dichloro(tetrahydrofuran)tungsten, (phenylimido)tetrachloro(acetonitrile)rhenium, (pentafluorophenylimido)tetrafluororhenium, (2,6-diisopropylphenylimido)trichlorobis(pyridine)tantalum, (4-chlorophenylimido)trichlorobis(triphenylphosphine)osmium, (2-cyanophenylimido)trichloroniobium, or (phenylimido)trichlorobis(tetrahydrofuran)niobium.

4. The catalyst system of claim 3 wherein the imido transition metal compound is (2,6-diisopropylphenylimido)tungsten tetrachloride.

5. The catalyst system of claim 1 wherein the biphenol is present in the reaction mixture in the range of about 0.2 to about 2.0 moles per mole of the transition metal.

6. The catalyst system of claim 1 wherein the co-catalyst is selected from the group consisting of organotin hydrides, borohydrides and organoaluminum compounds.

7. The catalyst system of claim 1 wherein the co-catalyst is tributyltin hydride.

8. The catalyst system of claim 1 wherein the co-catalyst is bis(triphenylphosphine) copper (I) borohydride.

9. The catalyst system of claim 1 wherein the imido transition metal compound is an arylimidotungsten tetrahalide.

10. The catalyst system of claim 1 which further comprises a boron halide promotor.

11. An olefin metathesis catalyst system comprising (1) the reaction product of:
   (a) an imido transition metal compound of the formula:

wherein Ar is $C_{6-20}$ aryl; M is a transition metal selected from the second and third rows of Groups 5, 6, 7 and 8 of the Periodic Table; R is independently halide, $C_{1-20}$ alkyl, $C_{1-12}$ alkoxy, $C_{1-12}$ haloalkyl, $C_{6-20}$ aryl, $C_{6-20}$ aryloxy, cyano or combinations thereof; L is independently a complexing ligand selected from carbonyl, $C_{1-12}$ alkoxy, $C_{1-12}$ haloalkoxy, $C_{1-12}$ alkyl ethers, $C_{1-12}$ alkylnitriles, $C_{5-20}$ pyridines, $C_{3-36}$ tri(hydrocarbyl)phosphines; X is independently halide; x is 2, 3 or 4; r is independently 0 to 5; y is 0 to 3; and x+y=3, 4 or 5; and
   (b) a biphenol selected from 2,2'-dihydroxyfluorene and 4,4'-dihydroxyfluorene; and
   (2) a co-catalyst.

12. A process of polymerizing one or more cycloolefins comprising contacting the one or more cycloolefins under polymerization conditions with an olefin metathesis catalyst system comprising the reaction product of:

(a) an imido transition metal compound of the formula:

 (I)

wherein Ar is $C_{6-20}$ aryl; M is a transition metal selected from the second and third rows of Groups 5, 6, 7 and 8 of the Periodic Table; R is independently halide, $C_{1-20}$ alkyl, $C_{1-12}$ alkoxy, $C_{1-12}$ haloalkyl, $C_{6-20}$ aryl, $C_{6-20}$ aryloxy, cyano or combinations thereof; L is independently a complexing ligand selected from carbonyl, $C_{1-12}$ alkoxy, $C_{1-12}$ haloalkoxy, $C_{1-12}$ alkyl ethers, $C_{1-12}$ alkylnitriles, $C_{5-20}$ pyridines, $C_{3-36}$ tri(hydrocarbyl)phosphines; X is independently halide; x is 2, 3 or 4; r is independently 0 to 5; y is 0 to 3; and $x+y=3$, 4, or 5; and (b) a biphenol of the formula:

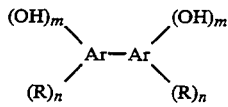

in which each Ar represents an aromatic ring-containing moiety having at least one hydroxyl group attached to an aromatic ring; each R is independently selected from $C_{1-12}$ alkyl, aryl, halide, mono-, di or trihalo methyl, cyano and alkoxy; each n is independently 0–4; and each m is independently 1–4;
wherein said catalyst system further comprises a co-catalyst.

13. The process of claim 12 wherein the biphenol is selected from the group consisting of 2,2'-biphenol, 4,4'-biphenol, 1,1'-bi-2-naphthol, tetra-tertiary-amyl-2,2'-biphenol, tetra-tertiary-amyl-4,4'-biphenol, tetra-tertiary-butyl-2,2'-biphenol and tetra-tertiary-butyl-4,4'-biphenol.

14. The process of claim 12 wherein the imido transition metal compound is selected from the group consisting of phenylimidotungsten tetrachloride, (2,6-diisopropylphenylimido)tungsten tetrachloride, (4-methylphenylimido)tetrachlorotungsten, (2,6-di-methylphenylimido)tetrachloro(diethylether)tungsten, (phenylimido)tetrachloro(diethylether)tungsten, (phenylimido)tetrachloro(tetrahydrofuran)tungsten, (phenylimido)bis(diphenylmethylphosphine)trichlorotungsten, (phenylimido)ethoxy(trimethylphosphine)trichlorotungsten, (phenylimido)tetrachloro(acetonitrile)tungsten, (phenylimido)tetrachloro(pyridine)tungsten, (2,6-diisopropylphenylimido)bis(hexafluoro-t-butoxy)dichloro(tetrahydrofuran)tungsten, (phenylimido)tetrachloro(acetonitrile)rhenium, (pentafluorophenylimido)tetrafluororhenium, (2,6-diisopropylphenylimido)trichlorobis(pyridine)tantalum, (4-chlorophenylimido)trichlorobis(triphenylphosphine)osmium, (2-cyanophenylimido)trichloroniobium, or (phenylimido)trichlorobis(tetrahydrofuran)niobium.

15. The process of claim 14 wherein the imido transition metal compound is 2,6-diisopropylphenylimido tungsten tetrachloride.

16. The process of claim 12 wherein the biphenol is present in the reaction mixture in the range of about 0.2 to about 2.0 moles per mole of the transition metal.

17. The process of claim 12 wherein the co-catalyst is selected from the group consisting of organotin hydrides, borohydrides and organoaluminum compounds.

18. The process of claim 12 wherein the co-catalyst is tributyltin hydride.

19. The process of claim 12 wherein the catalyst system further comprises a boron halide promotor.

20. A process of polymerizing one or more cycloolefins, comprising contacting the one or more cycloolefins under polymerization conditions with an olefin metathesis catalyst system as defined in claim 11.

* * * * *